United States Patent
Matsuda et al.

(10) Patent No.: US 11,870,498 B2
(45) Date of Patent: Jan. 9, 2024

(54) SERVER, OPTICAL TRANSMISSION METHOD, OPTICAL TRANSMISSION SYSTEM, AND OPTICAL TRANSMISSION PROGRAM

(71) Applicant: Nippon Telegraph and Telephone Corporation, Tokyo (JP)

(72) Inventors: Toshiya Matsuda, Musashino (JP); Kana Masumoto, Musashino (JP); Kazuyuki Matsumura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 177 days.

(21) Appl. No.: 17/606,249

(22) PCT Filed: May 8, 2019

(86) PCT No.: PCT/JP2019/018438
§ 371 (c)(1),
(2) Date: Oct. 25, 2021

(87) PCT Pub. No.: WO2020/225882
PCT Pub. Date: Nov. 12, 2020

(65) Prior Publication Data
US 2022/0209870 A1    Jun. 30, 2022

(51) Int. Cl.
*H04B 10/61*    (2013.01)
*H04B 10/516*    (2013.01)
*H04L 1/00*    (2006.01)

(52) U.S. Cl.
CPC ......... *H04B 10/616* (2013.01); *H04B 10/516* (2013.01); *H04L 1/0041* (2013.01); *H04L 1/0045* (2013.01)

(58) Field of Classification Search
CPC ... H04B 10/516; H04B 10/616; H04L 1/0045; H04L 1/0041
See application file for complete search history.

(56) References Cited

U.S. PATENT DOCUMENTS

| 8,707,131 B2 * | 4/2014 | Szapiro | H03M 13/3776 |
| | | | 714/763 |
| 11,675,503 B1 * | 6/2023 | Ekins | G06F 3/0683 |
| | | | 711/163 |

(Continued)

OTHER PUBLICATIONS

Liu et al., "Low-Power High-Throughput BCH Error Correction VLSI Design for Multi-Level Cell NAND Flash Memories," IEEE Workshop on Signal Processing Systems (SIPS), 2006, 6 pages.

(Continued)

*Primary Examiner* — Dzung D Tran
(74) *Attorney, Agent, or Firm* — Fish & Richardson P.C.

(57) ABSTRACT

A server that performs optical transmission using an optical transmission line includes a transmitter that transmits an optical signal to another server, a receiver that receives the optical signal from the other server, a storage device that stores data and an error correction code (ECC) added to the data, and a control unit that controls conversion of the data and the ECC into the optical signal, conversion of the optical signal into the data and the ECC, and error correction of the data using the ECC, and a transmission distance of the optical transmission line is a transmission distance for which an error rate does not exceed an allowable value of the error rate before correction which makes the error rate after correction based on the error correction using the ECC be equal to or less than a reference error rate.

10 Claims, 5 Drawing Sheets

(56) References Cited

U.S. PATENT DOCUMENTS

2003/0002116 A1* 1/2003 Hayashi ................. H04B 10/69
398/141
2008/0124078 A1* 5/2008 Fukashiro .......... H04Q 11/0005
398/50
2021/0314404 A1* 10/2021 Glek ................... G06F 11/2041

OTHER PUBLICATIONS

Schroeder et al., "DRAM Errors in the Wild: A Large-Scale Field Study," Proceedings of the 11th International Joint Conference on Measurement and Modeling of Computer Systems (SIGMETRICS), Jun. 15, 2009, 12 pages.
Yamamoto et al., "5 Gbit/s optical transmission terminal equipment using forward error correcting code and optical amplifier," Electronics Letters, 1994, 30(3):254-255, 4 pages.

* cited by examiner

SERVER, OPTICAL TRANSMISSION METHOD, OPTICAL TRANSMISSION SYSTEM, AND OPTICAL TRANSMISSION PROGRAM

CROSS-REFERENCE TO RELATED APPLICATIONS

This application is a National Stage application under 35 U.S.C. § 371 of International Application No. PCT/JP2019/018438, having an International Filing Date of May 8, 2019, the disclosure of which is considered part of the disclosure of this application, and is incorporated in its entirety into this application.

The present disclosure relates to a server, an optical transmission method, an optical transmission system, and an optical transmission program.

BACKGROUND ART

With the rapid increase in traffic in data centers, the development of small power-saving modules, such as Centum Gigabit Form-factor Pluggable (CFP) 4 or Quad Small Form-factor Pluggable (QSFP) 28 compatible with 100 Gigabit Ethernet (100 GbE) (Ethernet is a registered trademark), as optical interfaces in data centers, has been progressing. In the related art, dedicated Wavelength Division Multiplexing (WDM) transmission devices have been generally used when large-capacity optical interfaces of data centers or servers in different data centers are connected to each other.

On the other hand, optical modules that output any optical signals of WDM grids are being developed in order to directly connect between data centers or servers. For example, small modules (10 G small optical modules) such as 10 Gigabit Small Form-Factor Pluggable (XFP) and Small Form-Factor Pluggable Plus (SFP+), which are standards for 10 G, are now commercially available, and the use of these optical modules allows construction of a low-cost WDM system.

Some of the above-described 10 G small optical modules have a transmission distance of 80 km, which is sufficient to cover most of a metro area, which accounts for the majority of an increase in traffic of a data center interconnect (DCI). On the other hand, when a 25 G-based optical signal, which is mainstream in a 100 G optical module, is used, the sensitivity of reception deteriorates, and thus the transmission distance is reduced. In addition, when an optical module that multiplexes and demultiplexes WDM signals is used, the actual transmission distance is further reduced due to an insertion loss of the optical module. In order to avoid such a reduction in the transmission distance, it is effective to use an error correction code, and a forward error correction (FEC) code is actually used also in an optical transmitter/receiver of a dedicated WDM transmission device (see Non Patent Literature 1).

CITATION LIST

Non Patent Literature

Non Patent Literature 1: S. Yamamoto et al., "5 Gbit/s optical transmission terminal equipment using forward error correcting code and optical amplifier," Electron. Lett., Vol. 30, No. 3 p. 254, (1994).

Non Patent Literature 2: B. Schroeder et al., "DRAM Errors in the Wild: A Large-Scale Field Study," in Proceedings of the 11th International Joint Conference on Measurement and Modeling of Computer Systems (SIGMETRICS), Seattle, WA, June, 2009.

Non Patent Literature 3: W. Liu et al., "Low-Power High-Throughput BCH Error Correction VLSI Design for Multi-Level Cell NAND Flash Memories," IEEE Workshop on Signal Processing Systems (SIPS), pp. 248-253, (2006).

Technical Problem

However, a large-scale integrated circuit (LSI) for an FEC code that uses an FEC code generally has large power consumption, and thus it is difficult to mount the LSI inside a small optical module or in a server, a switch, or the like to which the small optical module is connected. In addition, with an increase in the speed of an electrical signal inside a small optical module for achieving a reduction in the cost of the small optical module, it is necessary to newly develop an LSI for an FEC code, which causes a problem that development costs increase.

In view of such circumstances, an object of the present disclosure is to reduce power consumption by eliminating the need for an LSI for error correction when implementing a low-cost optical transmission function using a server and a small optical module, and to reduce the cost of new development of an LSI for error correction in line with an increase in the speed of a small optical module.

Means for Solving the Problem

In order to solve the above-described problem, the invention according to a first aspect is a server that performs optical transmission using an optical transmission line, the server including a transmitter configured to transmit an optical signal to another server; a receiver configured to receive the optical signal from the other server, a storage device configured to store data and an error correction code (ECC) added to the data, and a control unit configured to control conversion of the data and the ECC into the optical signal, conversion of the optical signal into the data and the ECC, and error correction of the data using the ECC, in which a transmission distance of the optical transmission line is a transmission distance for which an error rate does not exceed an allowable value of the error rate before correction which makes the error rate after correction based on the error correction using the ECC be equal to or less than a reference error rate.

In addition, the invention according to a third aspect is an optical transmission method in a server that performs optical transmission using an optical transmission line, in which a transmission distance of the optical transmission line is a transmission distance for which an error rate does not exceed an allowable value of the error rate before correction which makes the error rate after correction based on error correction using an ECC be equal to or less than a reference error rate, the optical transmission method including, by the server functioning as a transfer source, reading data and the ECC from a storage device of the server, converting the read data and ECC into an optical signal, and transmitting the converted optical signal from a transmitter of the server, and, by the server functioning as a transfer destination, receiving an optical signal using a receiver of the server, converting the received optical signal into data and an ECC, and storing the data, which has been subjected to error correction using the ECC, and the ECC in the storage device of the server.

In addition, the invention according to a fourth aspect is an optical transmission system including a plurality of servers that perform optical transmission using an optical transmission line, in which each of the plurality of servers includes a transmitter configured to transmit an optical signal to another server, a receiver configured to receive the optical signal from the other server, a storage device configured to store data and an ECC added to the data, and a control unit configured to control conversion of the data and the ECC into the optical signal, conversion of the optical signal into the data and the ECC, and error correction of the data using the ECC, and a transmission distance of the optical transmission line is a transmission distance for which an error rate does not exceed an allowable value of the error rate before correction which makes the error rate after correction based on the error correction using the ECC be equal to or less than a reference error rate.

According to the inventions of the first, third, and fourth aspects, data error correction that has been performed using an FEC code (or both an FEC code and an ECC) in the related art can be replaced with that using an ECC that has been used in a storage device. For this reason, it is possible to eliminate the need for an LSI for an FEC code that has been used in the related art and avoid a problem that an LSI for an FEC code having a large power consumption cannot be mounted in a small optical module, a server, or the like and a problem that the cost of new development of an LSI for an FEC code is high. Thus, it is possible to reduce power consumption by eliminating the need for an LSI for error correction when implementing a low-cost optical transmission function using a server and a small optical module, and to reduce the cost of new development of an LSI for error correction in line with an increase in the speed of a small optical module.

In addition, the invention according to a second aspect is the server according to the first aspect, in which the storage device included in the server and another storage device included in the other server are virtualized to constitute one virtual storage device, and the control unit adds a transfer destination address to the data and the ECC which are converted into the optical signal in a case where the optical signal is transmitted.

According to the invention of the second aspect, the present disclosure can be applied even when the storage device of the server performing optical transmission is virtualized.

In addition, the invention according to a fifth aspect is an optical transmission program for causing a computer to operate as the server according to the first or second aspect.

According to the invention of the fifth aspect, it is possible to provide a program for reducing power consumption of an LSI for error correction in optical transmission and reducing the cost of development.

Effects of the Invention

According to the present disclosure, it is possible to reduce power consumption by eliminating the need for an LSI for error correction when implementing a low-cost optical transmission function using a server and a small optical module, and to reduce the cost of new development of an LSI for error correction in line with an increase in the speed of a small optical module.

DESCRIPTION OF EMBODIMENTS

Hereinafter, an embodiment for carrying out the present disclosure (hereinafter, referred to as "the present embodiment") will be described with reference to the accompanying drawings.

Overview

In servers of large-scale data centers, a dynamic random access memory (DRAM) compatible with an error correction code (ECC) may be used as a main storage device in order to improve reliability (see Non Patent Literature 2). Further, in storage devices such as a solid state drive (SSD) and a hard disk drive (HDD), which have a higher frequency of error occurrence than DRAMs, a stronger ECC such as a BCH code have been generally used (see Non Patent Literature 3). In addition, there is also an ECC mounted on a dual inline memory module (DIMM). An ECC used in these (main) storage devices has an error correction capability lower than that of an FECcode that is used for transmission in the related art. However, assuming that a bit error occurring in an optical transmission line over a relatively short distance is small, it is conceivable to use an ECC as a substitute for an FEC code that is used for transmission in the related art. The present disclosure realizes an optical transmission system using an ECC in relatively short-distance transmission such as interconnection between data centers in a metropolitan area.

Configuration

Figure 1:
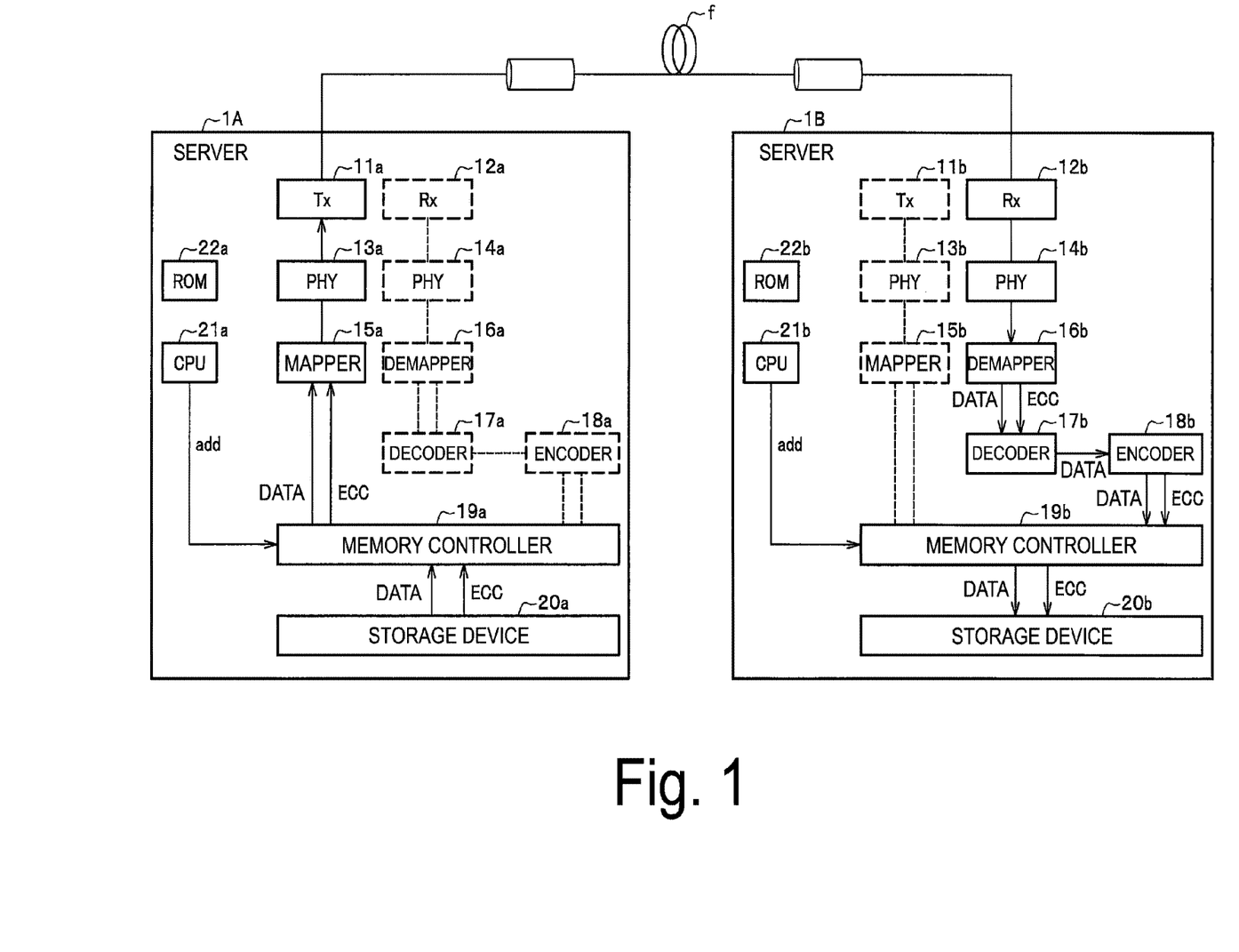
FIG. 1 is a functional configuration diagram of an optical transmission system according to the present embodiment.

As illustrated in FIG. 1, an optical transmission system of the present embodiment includes servers 1A and 1B. The servers 1A and 1B are connected to each other by an optical transmission line f. The server 1A is disposed in a data center (not illustrated). The server 1B is disposed in a data center (not illustrated) distant from the data center where the server 1A is disposed. The optical transmission line f may be, for example, an optical fiber transmission line, and may be constituted by an optical fiber having a predetermined length and a plurality of optical amplifiers, but is not limited thereto. In the present embodiment, a case where an optical signal is transmitted from the server 1A to the server 1B will be described. Thus, the server 1A functions as a transfer source server, and the server 1B functions as a transfer destination server. Note that the number of servers including the optical transmission system of FIG. 1 is not limited to two, that is, the servers 1A and 1B, and may be three or more.

The server 1A is a computing system that performs predetermined arithmetic operation, and may be, for example, a host computer. As illustrated in FIG. 1, the server 1A includes a Tx 11a (transmitter), an Rx 12a (receiver), PHYs 13a and 14a, a mapper 15a, a demapper 16a, a decoder 17a, an encoder 18a, a memory controller 19a, a storage device 20a, a CPU 21a (control unit), and a ROM 22a.

The Tx 11a is a transmitter that transmits an optical signal to the outside (for example, the server 1B). The Tx 11a can convert an electrical signal received from the PHY 13a into an optical signal.

The Rx 12a is a receiver that receives an optical signal from the outside. The Rx 12a can convert an optical signal into an electrical signal. Note that, in a case where the server 1A functions as a transfer source server, the Rx 12a does not operate.

Optical modules used in the Tx 11a and the Rx 12a may be configured as small optical modules of standards of, for example, XFP or SFP+ for 10 G, QSFP+ for 40 G, and QSFP28 for 100 G, but are not limited thereto. Optical modules which are not small may be used. In addition, it is possible to provide one or more optical modules for use in the Tx 11a and the Rx 12a. In addition, a multiplexer and a demultiplexer for a WDM may also be used as the Tx 11a and the Rx 12a.

The PHYs 13a and 14a are processing functional units of a layer 1 of an open system interconnection (OSI) reference model. The PHY 13a can convert a digital signal received from the mapper 15a into an electrical signal. The PHY 14a can convert an electrical signal received from the Rx 12a into a digital signal. Note that, in a case where the server 1A functions as a transfer source server, the PHY 14a does not operate.

The mapper 15a performs data mapping. Mapping refers to converting a digital bit string into a symbol (constellation) in a complex plane (IQ plane). The mapper 15a can map data and an ECC received from the memory controller 19a so as to be contained in a payload of a transmission frame and output the data and the ECC as digital signals.

The demapper 16a performs data demapping. Demapping refers to extracting bits mapped to a symbol. The demapper 16a can extract the data and the ECC contained in the payload of the transmission frame from the digital signal received from the PHY 14a. In addition, the demapper 16a outputs the extracted data and ECC to the decoder 17a. Note that, in a case where the server 1A functions as a transfer source server, the demapper 16a does not operate.

The decoder 17a performs data decoding. The decoder 17a can perform data error correction from the data and the ECC received from the demapper 16a. The decoder 17a outputs the data that has been subjected to error correction to the encoder 18a. Note that, in a case where the server 1A functions as a transfer source server, the decoder 17a does not operate.

The encoder 18a performs data encoding. The encoder 18a can generate an ECC from data received from the decoder 17a. A technique for generating an ECC from data is well known, and thus detailed description thereof will be omitted. The encoder 18a outputs the data and the ECC to the memory controller 19a. Note that, in a case where the server 1A functions as a transfer source server, the encoder 18a does not operate.

The memory controller 19a reads and writes data and an ECC stored in the storage device 20a.

The storage device 20a stores the data and the ECC.

The CPU 21a controls the processing of the server 1A. Thus, the CPU 21a can control the operations of the Tx 11a, the Rx 12a, the PHYs 13a and 14a, the mapper 15a, the demapper 16a, the decoder 17a, the encoder 18a, the memory controller 19a, and the storage device 20a, can control conversion of data and an ECC into optical signals and conversion of optical signals into data and an ECC, and can perform data error correction using an ECC. In addition, the CPU 21a can add address information "add" to data and an ECC. The CPU 21a outputs the address information "add" to the memory controller 19a, and the memory controller 19a stores the data and the ECC in the storage device 20a in accordance with the address information "add". The ROM 22a is a recording medium for a program (optical transmission program) that describes the processing of the server 1A, the recording medium being controlled by the CPU 21a.

The server 1B is a computing system that performs predetermined arithmetic operation, and may be, for example, a host computer. As illustrated in FIG. 1, the server 1B includes a Tx 11b, an Rx 12b, PHYs 13b and 14b, a mapper 15b, a demapper 16b, a decoder 17b, an encoder 18b, a memory controller 19b, a storage device 20b, a CPU 21b, and a ROM 22b. The Tx 11b, the Rx 12b, the PHYs 13b and 14b, the mapper 15b, the demapper 16b, the decoder 17b, the encoder 18b, the memory controller 19b, the storage device 20b, the CPU 21b, and the ROM 22b are respectively the same as the Tx 11a, the Rx 12a, the PHYs 13a and 14a, the mapper 15a, the demapper 16a, the decoder 17a, the encoder 18a, the memory controller 19a, the storage device 20a, the CPU 21a, and the ROM 22a described above, and thus detailed description thereof will be omitted. Note that, in a case where the server 1B functions as a transfer destination server, the Tx 11b, the PHY 13b, and the mapper 15b do not operate.

Processing

Figure 2:
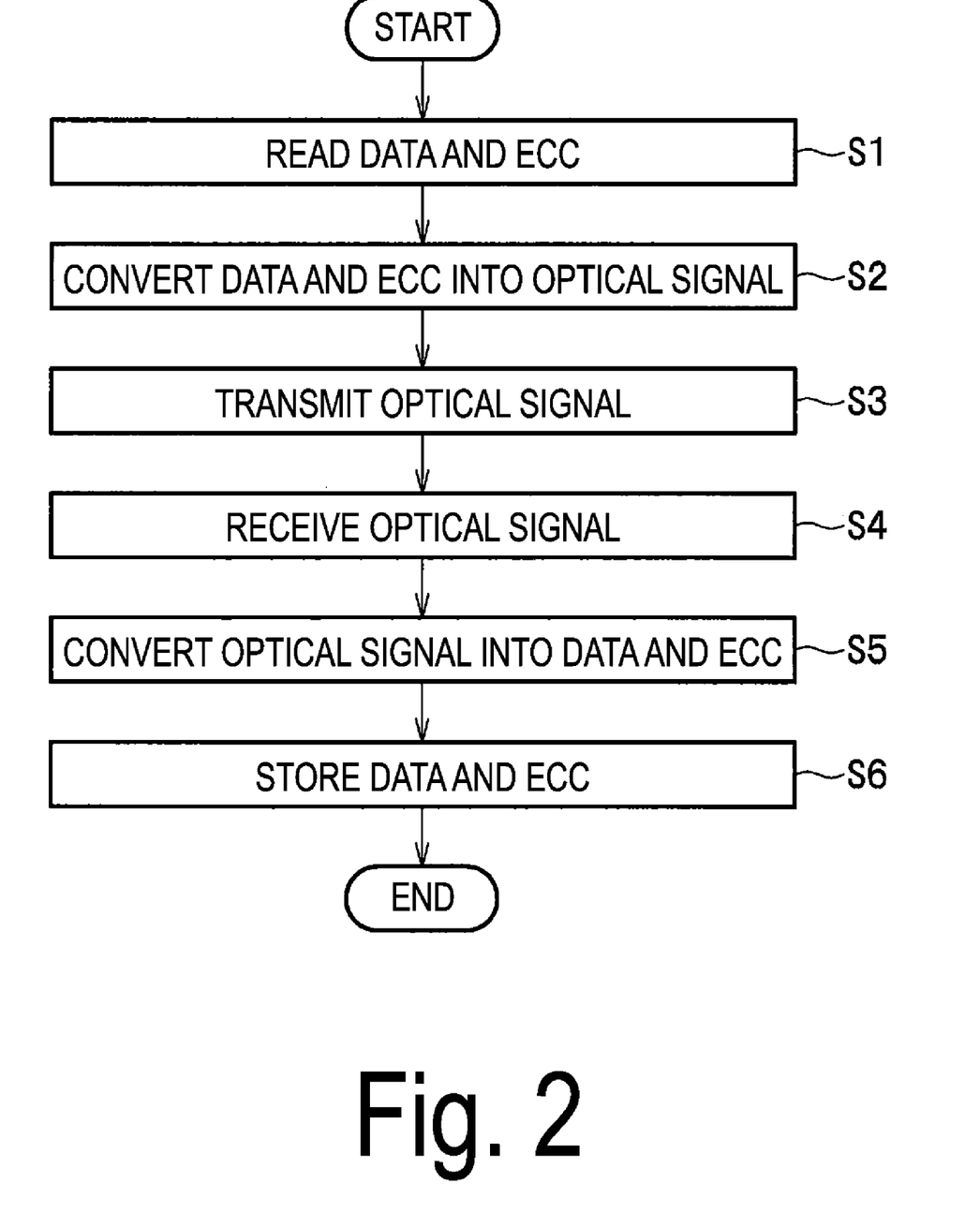
FIG. 2 is a flowchart of an optical transmission process.

Referring to FIG. 2, an optical transmission process of the server 1A which is a transfer source and the server 1B which is a transfer destination will be described.

In the server 1A which is a transfer source, the storage device 20a stores data with an ECC. The memory controller 19a reads the data and the ECC from the storage device 20a (step S1). The read data and ECC are converted into an optical signal under the control of the CPU 21a (step S2). Specifically, the mapper 15a maps the data and the ECC so as to be contained in a payload of a transmission frame and outputs the mapped data and ECC as a digital signal. The PHY 13a converts the digital signal into an electrical signal. The Tx 11a converts the electrical signal into an optical signal. Thereafter, the Tx 11a transmits the optical signal to the server 1B through the optical transmission line f (step S3).

In the server 1B which is a transfer destination, the Rx 12b receives the optical signal from the server 1A (step S4). Next, the received optical signal is converted into data and an ECC under the control of the CPU 21b (step S5). Specifically, the Rx 12b converts the optical signal into an electrical signal. The PHY 14b converts the electrical signal into a digital signal. The demapper 16b extracts data and an ECC from a payload of a transmission frame of the digital signal. The decoder 17b performs error correction of the data. The encoder 18b adds an ECC to the data having been re-subjected to error correction. The memory controller 19b stores the data, which has been subjected to error correction using the ECC, and the ECC in the storage device 20b in accordance with the address information "add" received from the CPU 21b (step S6). Thus, optical transmission between the servers 1A and 1B is completed.

Other Configurations

Figure 3:
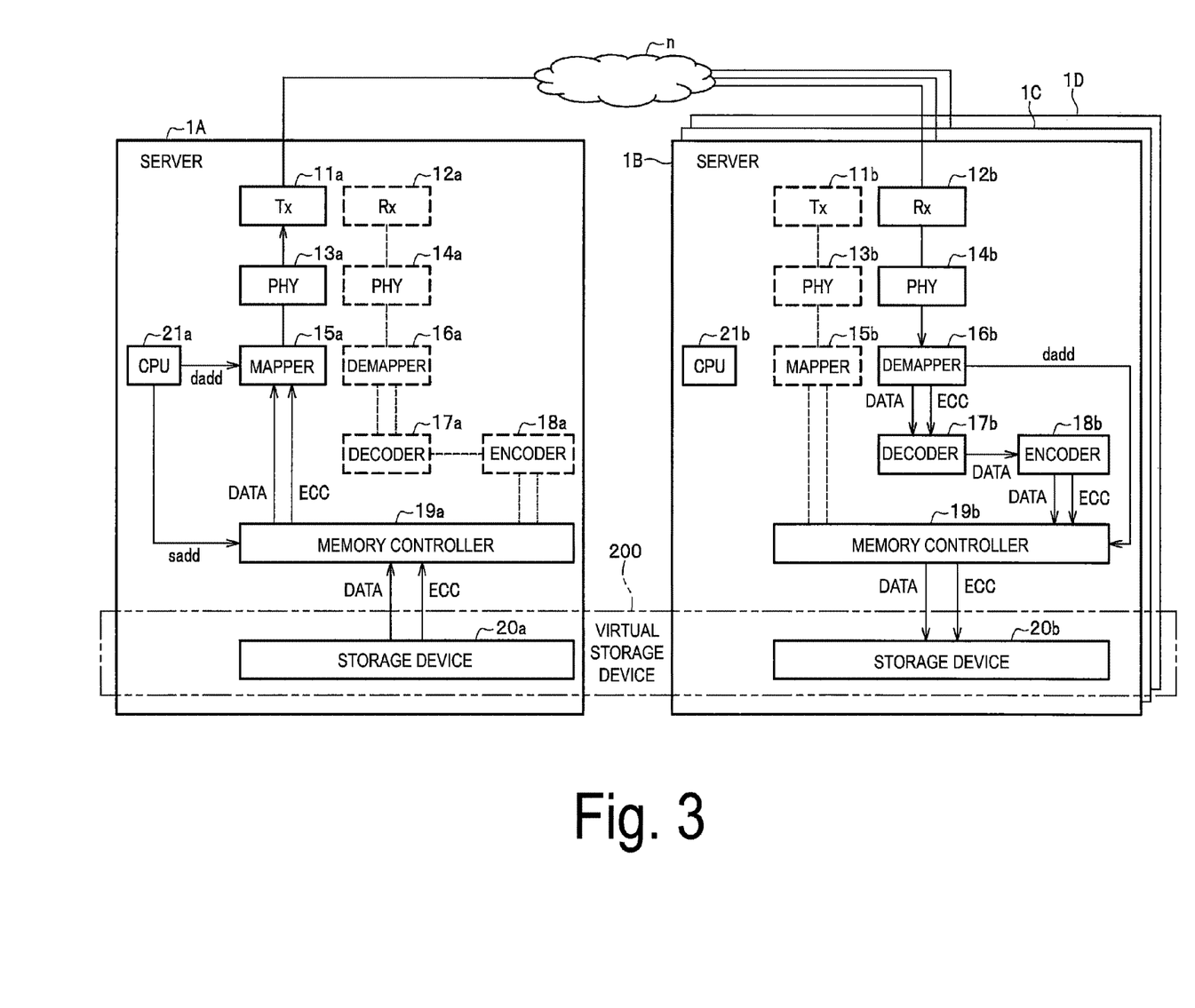
FIG. 3 is a functional configuration diagram of an optical transmission system having another configuration.

As another configuration of an optical transmission system, there is a configuration in which storage devices of a plurality of servers are virtualized to constitute one virtual storage device. For example, as illustrated in FIG. 3, in the case of an optical transmission system including a plurality of servers 1A to 1D connected to each other through a network n, the storage device 20a included in the server 1A, the storage device 20b included in the server 1B, a storage device (not illustrated) included in a server 1C, and a storage device (not illustrated) included in a server 1D are virtualized to constitute one virtual storage device 200. Regarding FIG. 3, description duplicating that for FIGS. 1 and 2 will be omitted. The network n is a network for realizing optical transmission using an optical transmission line.

In the case of an optical transmission system having another configuration, data transmitted from a transfer source server may extend over a plurality of pieces of transfer destination data. For this reason, an address of a transfer destination server is added to the data transmitted from the transfer source server to specify a transfer destination of the data. According to the configuration illustrated in FIG. 3, in the server 1A functioning as a transfer source server, the mapper 15a acquires, from the CPU 21a, transfer destination address information "dadd" serving as an address of a transfer destination of data.

When the mapper 15a outputs a transmission frame containing data and an ECC as a digital signal from the memory controller 19a, the mapper 15a contains the transfer destination address information "dadd" acquired from the CPU 21a in a header of the transmission frame. Thereby, after conversion into an electrical signal by the PHY 13a and conversion into an optical signal by the Tx 11a, the Tx 11a can reliably transmit the optical signal to a target transfer destination server.

Note that the memory controller 19a acquires transfer source address information "sadd" serving as an address of a transfer source of data from the CPU 21a, and stores or reads data which has been subjected to error correction and an ECC in or from the storage device 20b in accordance with the transfer source address information "sadd" from the CPU 21a.

In a case where a target transfer destination server is the server 1B, after conversion of an optical signal into an electric signal by Rx 12b and a digital signal by PHY 14b in the server 1B, the demapper 16b extracts data and an ECC from a payload of a transmission frame of a digital signal, extracts the transfer destination address information "dadd" (an address indicating the server 1B) from the header of the transmission frame, and outputs the extracted data, ECC, and transfer destination address information to the memory controller 19b. The memory controller 19b stores data which has been subjected to error correction and an ECC in the storage device 20b in accordance with the transfer destination address information "dadd" received from the demapper 16b. Thus, it is possible to realize optical transmission between the servers 1A and 1B. In this optical transmission, the Tx 11b, the PHY 13b, and the mapper 15b do not operate.

Even when a target transfer destination server is the server 1C or the server 1D, the transfer destination address information "dadd" (an address indicating the server 1C or 1D) acquired from the CPU 21a is contained in the header of the transmission frame, whereby it is possible to similarly realize optical transmission between the servers 1A and 1C (or 1D).

Note that remote direct memory access (RDMA), such as Infiniband or RDMA over Converged Ethernet (RoCE), is known as a transfer protocol in a virtualized network between data centers, and RDMA, such as Infiniband or RoCE, can also be applied to the optical transmission system illustrated in FIG. 3, but is not limited thereto.

EXAMPLE

Figure 4:
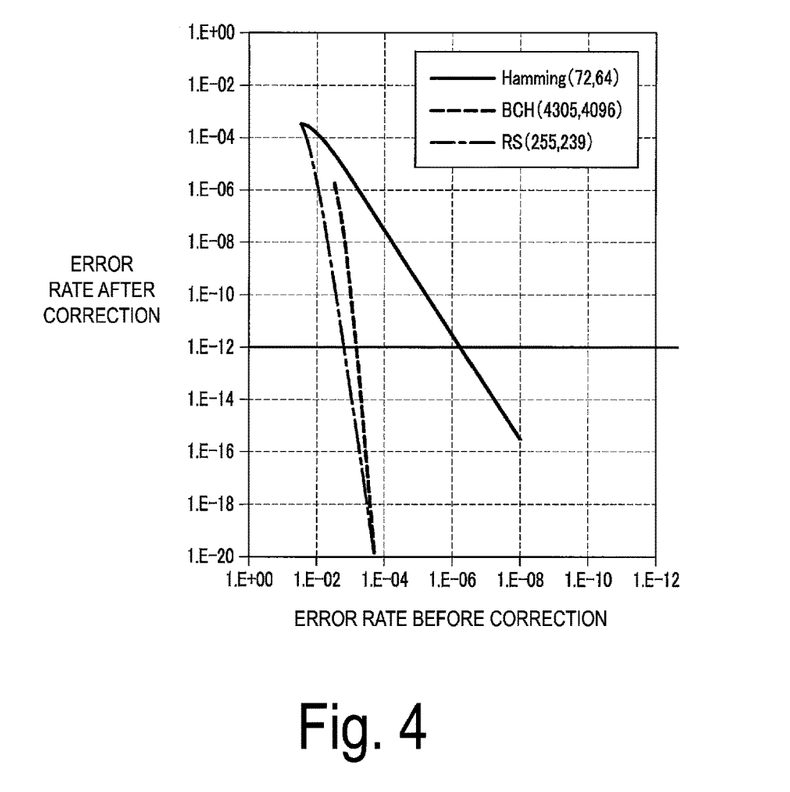
FIG. 4 is a graph illustrating error correction capabilities of various error correction codes.

An error correction capability of an ECC used in the present embodiment will be described. FIG. 4 is a graph illustrating a relationship between an error rate before correction and an error rate after correction. FIG. 4 illustrates error correction capabilities of a Hamming code as an ECC used in a DRAM, a BCH code as an ECC used in an SSD, and a general Reed-Solomon code as an FEC code for transmission according to a comparative example.

The Hamming code has a code length of 8 bits and an error correction capability of 1 bit for a data length of 64 bits (Hamming (72, 64)).

The BCH code has a code length of 209 bits and an error correction capability of 16 bits for a data length of 4096 bits (BCH (4305, 4096)).

The Reed-Solomon code has a code length of 16 bits and an error correction capability of 8 bits for a data length of 239 bits (RS (255, 239)).

An error rate after correction $P_e$ illustrated in FIG. 4 can be calculated using the following approximate expression (Equation 1) (Reference: Koga et al., "Bit Error Rate Improvement Characteristics in BCH Code and Self-Orthogonal Code", IEICE (B) Vol. J62-B, No. 2, pp. 117-124, (1979).)

[Math. 1]

$$P_e \approx \gamma_{t+1} \binom{n}{t+1} p^{t+1} \qquad \text{Equation 1}$$

Here, $\gamma_{t+1}$ is an average number of output errors when the number of input errors is t+1, n is a block length including a data length and a code length, t is an error correction capability, and p is an error rate before correction. According to FIG. 4, it can be understood that error rates before correction of approximately 6.E-7, 7.E-4, and 2.E-3 are respectively allowed in the Hamming code, the BCH code, and the Reed-Solomon code in order to achieve 1.E-12 ($1 \times 10^{-12}$, hereinafter, may be referred to as a "reference error rate"), which is a reference error rate of transmission quality.

Figure 5:
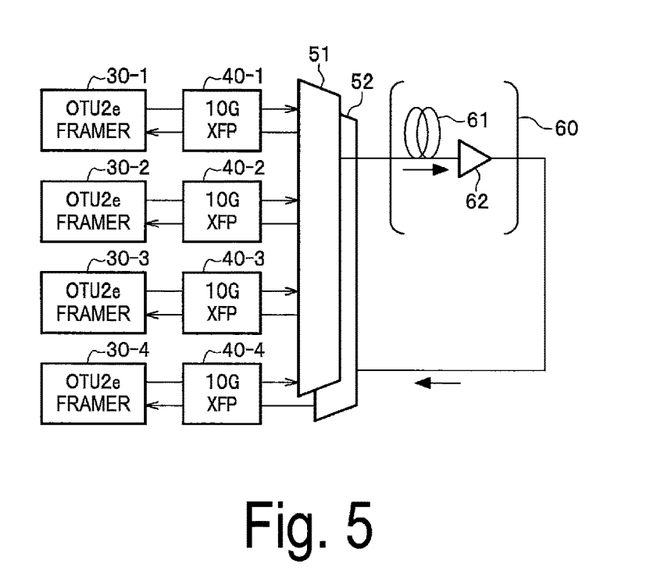
FIG. 5 is a functional configuration diagram of a WDM signal transmission experiment system using a 10 G small optical module.

FIG. 5 illustrates a WDM signal transmission experiment system using a 10 G small optical module (10 G XFP). The experiment system illustrated in FIG. 5 includes optical-channel transport unit (OTU) 2e framers 30-1 to 30-4, 10 G XFPs 40-1 to 40-4, a multiplexer 51, a demultiplexer 52, and N relay spans 60. Each of the relay spans 60 includes a wavelength dispersion shifted fiber (DSF) 61b having a length of 100 km and an optical amplifier (erbium doped optical fiber amplifier: EDFA) 62.

The OTU 2e framers 30-1 to 30-4 generate a pseudo random pattern for a test having a bit rate of approximately 11 Gbit/s. The generated pseudo random pattern for a test is an electrical signal to be input to each of the 10 G XFPs 40-1 to 40-4.

For the 10 G XFPs 40-1 to 40-4, a small optical module having a transmission distance of 40 km according to the specifications was used.

The multiplexer 51 wavelength-multiplexes optical signals output from the 10 G XFPs 40-1 to 40-4 at intervals of 0.4 nm to generate a WDM signal. The WDM signal passes through the N relay spans 60. The value of N can be freely determined in order to adjust a transmission distance.

The demultiplexer 52 demultiplexes the WDM signal that has passed through the relay spans 60, and inputs the demultiplexed optical signals into each of the 10 G XFPs 40-1 to 40-4.

The OTU 2e framers 30-1 to 30-4 can measure the number of error corrections and an error rate for the optical signals input to the 10 G XFPs 40-1 to 40-4.

Figure 6:
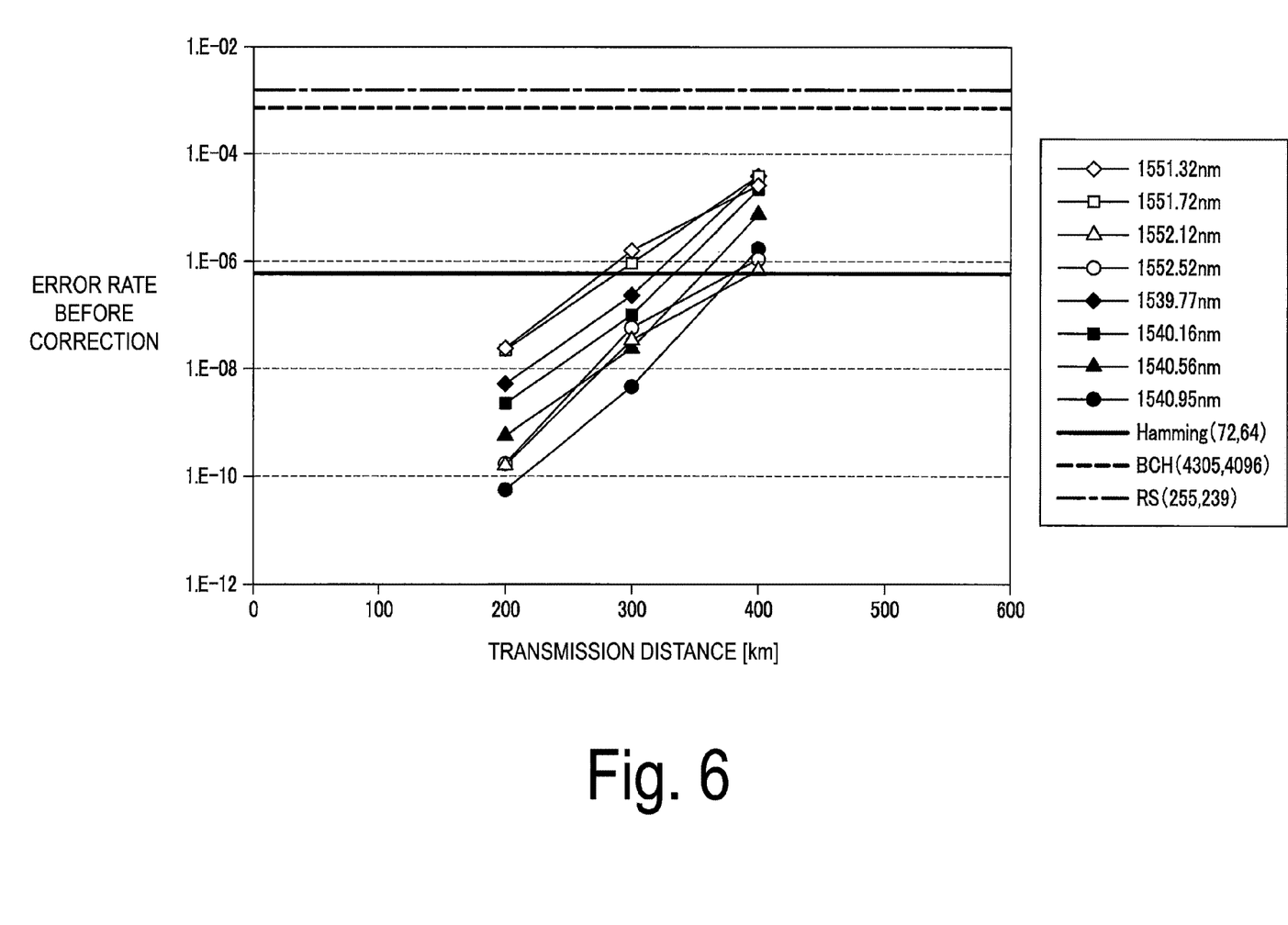
FIG. 6 is a graph illustrating a relationship between a transmission distance and an error rate before correction.

FIG. 6 illustrates a relationship between a transmission distance and an error rate before error correction (error rate before correction) as measurement results of the OTU 2e framers 30-1 to 30-4. Error rates before correction when the transmission distance is set to 200 km, 300 km, and 400 km for optical signals having wavelengths of 1551.32 nm, 1551.72 nm, 1552.12 nm, 1552.52 nm, 1539.77 nm, 1540.16 nm, 1540.56 nm, and 1540.95 nm are shown.

Further, in FIG. 6, a horizontal solid line indicates the allowable value (6.E-7) of the error rate before correction of the Hamming code that has been already described, a horizontal dashed line indicates the allowable value (7.E-4) of the error rate before correction of the BCH code that has already been described, and a horizontal alternating dotted-dashed line indicates the allowable value (2.E-3) of the error rate before correction of the Reed-Solomon code that has already been described.

According to FIG. 6, for an optical signal having any wavelength, it can also be understood that an error rate before correction when the optical signal is transmitted 200 km is equal to or less than 1.E-7, which is lower than the allowable value (6.E-7) of the error rate before correction of the Hamming code. In addition, the error rate before correction increases as the transmission distance increases. Thus, in a case where the transmission distance is set to be a short distance like 200 km, the error rate can be corrected to the reference error rate ($1\times10^{-12}$) or less even with a Hamming code for a DRAM, and thus it can be understood that sufficient transmission quality can be obtained.

Thus, the error rate can be corrected to the reference error rate ($1\times10^{12}$) or less even with error correction using an ECC such as a Hamming code by introducing a transmission system equivalent to the experiment system in FIG. 5 into the optical transmission system in FIG. 1, and thus it can be said that sufficient transmission quality can be obtained. Specifically, in a case where the Tx 11a and the Rx 12a of the server 1A of FIG. 1 include one or a plurality of small optical modules of a standard such as 10 G XFP, the transmission distance of the optical transmission line f of FIG. 1 is set to be a transmission distance for which an error rate does not exceed an allowable value of the error rate before correction which makes the error rate after correction based on error correction using an ECC be equal to or less than a reference error rate, and thus sufficient transmission quality can be obtained. The same applies to the server 1B in FIG. 1 and the servers 1C and 1D in FIG. 3. In addition, the Tx 11a and the Rx 12a of the server 1A of FIG. 1 may include a multiplexer and a demultiplexer for WDM.

Conclusion

According to the present embodiment, data error correction that has been performed using an FEC code (or both an FEC code and an ECC) in the related art can be replaced by an ECC used in a storage device. For this reason, it is possible to eliminate the need for an LSI for an FEC code that has been used in the related art and avoid a problem that an LSI for an FEC code having large power consumption cannot be mounted on a small optical module, a server, or the like and a problem that the cost of new development of an LSI for an FEC code increases. Thus, it is possible to reduce power consumption by eliminating the need for an LSI for error correction when implementing a low-cost optical transmission function using a server and a small optical module, and to reduce the cost of new development of an LSI for error correction in line with an increase in the speed of a small optical module.

In addition, the present disclosure can be applied even when the storage device of the server performing optical transmission is virtualized.

Supplement

A technique obtained by appropriately combining various techniques described in the present embodiment may be implemented.

REFERENCE SIGNS LIST 1A, 1B server
11a, 11b Tx (transmitter)
12a, 12b Rx (receiver)
13a, 13b, 14a, 14b PHY
15a, 15b mapper
16a, 16b demapper
17a, 17b decoder
18a, 18b encoder
19a, 19b memory controller
20a, 20b storage device
21a, 21b CPU (control unit)
22a, 22b ROM
f Optical transmission line

The invention claimed is:

1. A server that performs optical transmission using an optical transmission line, the server comprising:
   a transmitter configured to transmit an optical signal to a second server;
   a receiver configured to receive the optical signal from the second server;
   a storage device configured to store data and an error correction code (ECC) added to the data; and
   a control unit, including one or more processors, configured to control conversion of the data and the ECC into the optical signal, conversion of the optical signal into the data and the ECC, and error correction of the data using the ECC,
   wherein a transmission distance of the optical transmission line is a transmission distance over which an error rate, before error correction, does not exceed an allowable value of the error rate, such that an error rate after correction based on the error correction using the stored ECC is equal to or less than a reference error rate.

2. The server according to claim 1, wherein the storage device included in the server and another storage device included in the second server are virtualized to constitute one virtual storage device, and the control unit, in a case where the optical signal is transmitted, adds a transfer destination address to the data and the ECC which are converted into the optical signal.

3. The server according to claim 1, wherein the error rate before correction increases as the transmission distance increases.

4. The server according to claim 1, wherein the transmitter includes one or more 10 Gigabit small form-factor pluggable (XFP) optical modules.

5. An optical transmission method carried out by a server that performs optical transmission using an optical transmission line,
   wherein a transmission distance of the optical transmission line is a transmission distance over which an error rate, before error correction, does not exceed an allowable value of the error rate, such that an error rate after correction based on error correction using an error correction code ECC) stored in a storage device of the server is equal to or less than a reference error rate, the optical transmission method comprising:

by the server functioning as a transfer source:
reading data and the ECC from the storage device of the server;
converting the read data and the ECC into an optical signal; and
transmitting the converted optical signal from a transmitter of the server, and by the server functioning as a transfer destination:
receiving an optical signal using a receiver of the server;
converting the received optical signal into data and an ECC; and
storing the data, which has been subjected to error correction using the ECC, and the ECC in the storage device of the server.

6. The optical transmission method according to claim 5, wherein the error rate before correction increases as the transmission distance increases.

7. The optical transmission method according to claim 5, wherein the transmitter includes one or more 10 Gigabit small form-factor pluggable (XFP) optical modules.

8. An optical transmission system comprising:
a plurality of servers that perform optical transmission using an optical transmission line,
wherein each of the plurality of servers includes:
a transmitter configured to transmit an optical signal to another server,
a receiver configured to receive the optical signal from the another server,
a storage device configured to store data and an error correction code (ECC) added to the data, and
a control unit, including one or more processors, configured to control conversion of the data and the ECC into the optical signal, conversion of the optical signal into the data and the ECC, and error correction of the data using the ECC,
wherein a transmission distance of the optical transmission line is a transmission distance over which an error rate, before error correction, does not exceed an allowable value of the error rate, such that an error rate after correction based on the error correction using the stored ECC is equal to or less than a reference error rate.

9. The optical transmission system according to claim 8, wherein the error rate before correction increases as the transmission distance increases.

10. The optical transmission system according to claim 8, wherein the transmitter includes one or more 10 Gigabit small form-factor pluggable (XFP) optical modules.

* * * * *